United States Patent
Schmuck

[15] 3,688,522
[45] Sept. 5, 1972

[54] OVERLOAD CLUTCH PERMITTING TORQUE TRANSMISSION DURING OVERLOAD

[72] Inventor: Peter Schmuck, Mauren, Liechtenstein, Germany

[73] Assignee: Hilti Aktiengesellschaft, Schaan, Liechtenstein, Germany

[22] Filed: Dec. 10, 1970

[21] Appl. No.: 96,844

[30] Foreign Application Priority Data

Dec. 29, 1969 Germany..........P 19 65 275.6

[52] U.S. Cl.....................................................64/29
[51] Int. Cl..............................................F16d 7/00
[58] Field of Search.........................................64/29

[56] References Cited

UNITED STATES PATENTS

| | | | |
|---|---|---|---|
| 2,336,877 | 12/1943 | Matthews et al............ | 64/29 X |
| 2,401,992 | 6/1946 | Waller........................ | 64/29 X |
| 2,773,370 | 12/1956 | Intraub et al................ | 64/29 |
| 3,167,936 | 2/1965 | Engquist...................... | 64/29 |

Primary Examiner—Allan D. Herrmann
Attorney—McGlew & Toren

[57] ABSTRACT

An overload clutch includes a first drive part of circular cross-section having a circumferential surface with a groove which mates with a second drive part of ring-shaped configuration which has a surface in running engagement with the first part and which also contains a circumferential groove. One of the two parts includes a plurality of radially extending and angularly spaced recesses or bores each of which carries a spring-loaded ball member which is urged toward engagement with the other part. The other part includes an engagement opening for receiving the ball and the two parts rotate together in a form-locked manner with the balls engaged in the engagement openings to transmit torque. During an overload, the balls may move out of the associated engagement openings and ride along the safety grooves permitting relative rotation of the two parts under constant engagement and disengagement of the balls in the engagement openings and safety grooves.

5 Claims, 7 Drawing Figures

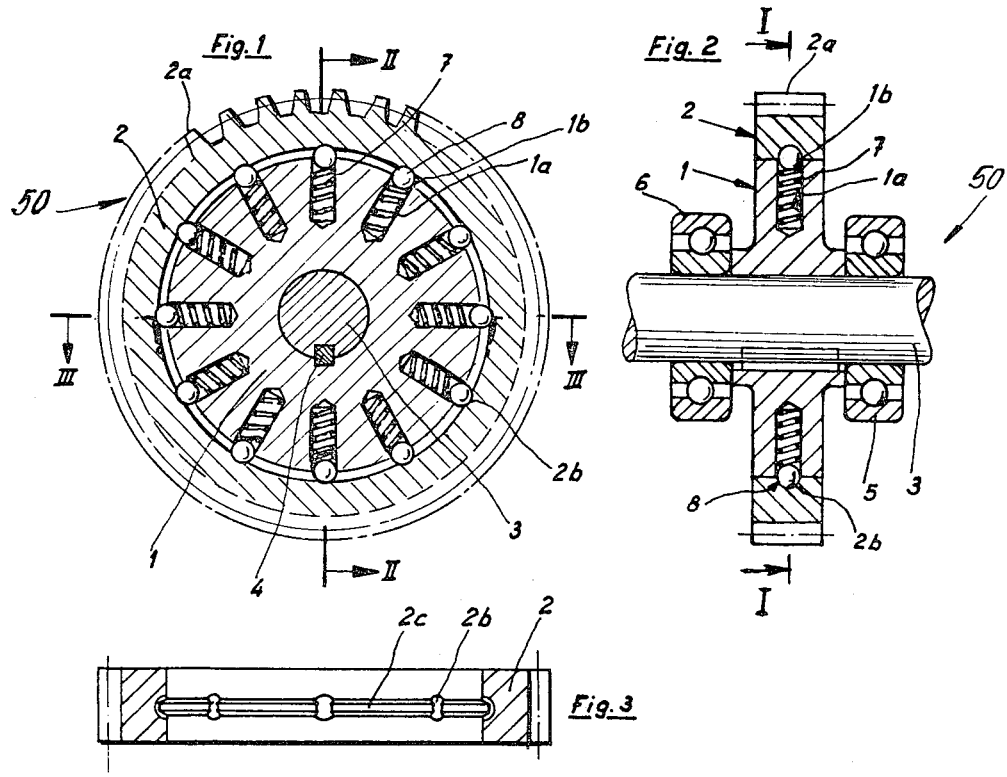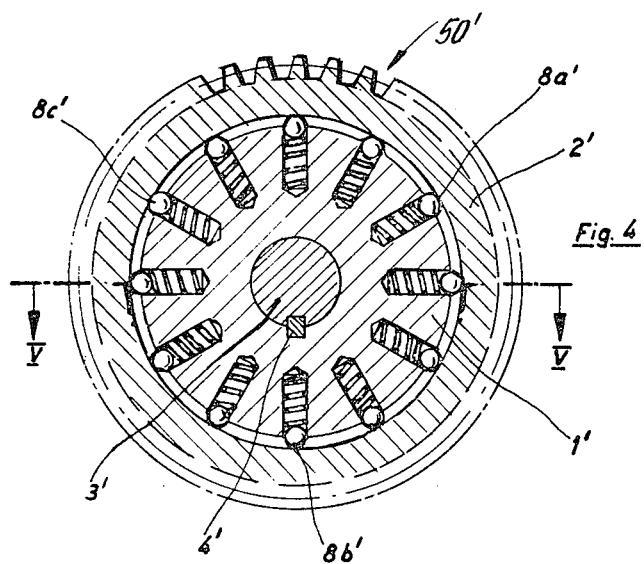

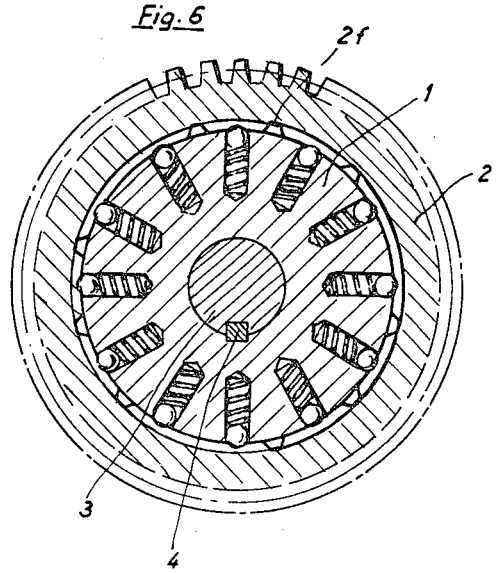
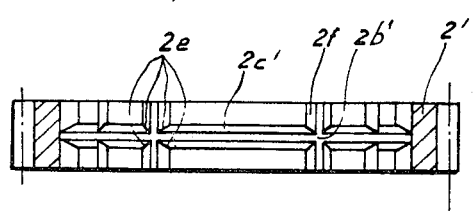
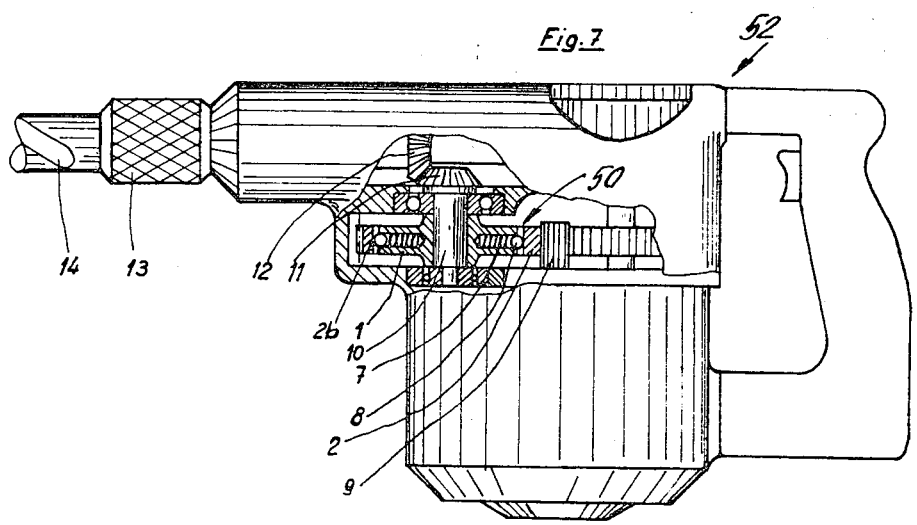

3,688,522

OVERLOAD CLUTCH PERMITTING TORQUE TRANSMISSION DURING OVERLOAD

SUMMARY OF THE INVENTION

This invention relates in general to the construction of clutches and, in particular, to a new and useful overload clutch for transmitting a torque, which is limited in force, between a driving member and a driven member of two coaxially arranged drive parts of which one part has channels whose openings are traversed by a spring-loaded ball and which are in engagement with the corresponding openings provided in the contact surface of the other part.

The presently known clutches of the overload type comprise two disc-shaped drive parts arranged in series. One drive part has a number of bores on a circle whose diameter is smaller than the outside diameter and whose openings are traversed each by a spring-loaded ball which is held in engagement with a recess provided on the other drive part. In this way, a form-closed connection is effected between the two parts which is necessary for the transmission of a torque. If the torque is too high, the radial forces of one drive part exceeds the axial forces exerted by the springs on the balls and the balls are forced backwardly against the spring force and move out of the recesses and the two drives can be turned mutually under constant engagement and disengagement of the balls. A difficulty in the operation of such constructions is that much space is required in axial directions since special safety elements must be provided to maintain the spring pressure acting in such axial directions. In addition, there is little space available for the springs in an axial direction so that short springs must be used and thus the application possibilities are limited.

In accordance with the present invention, there is provided an improved overload clutch which includes one drive part of circular cross-section and another drive part of ring-shaped cross-section and with an inside diameter corresponding to the outside diameter of the first part so that they may run rotatably relative to each other. The ring-shaped part is arranged concentrically to the circular cross-section drive part and encloses the latter. Channels are provided in one of the parts for receiving balls which are loaded by springs in a direction to cause them to move toward the other part and the other part is provided with grooves or recesses forming engagement areas for the balls for effecting a driving rotation of the two parts together. The balls form a form-closed connection between the one part and the other part which is necessary for the transmission of a torque. In the construction of the invention, the ball-receiving grooves of the one part are traversed by a circumferential safety groove with a smaller geometric cross-section than the engagement openings. This safety groove permits axial yielding of the two drive parts in response to an overload when the maximum transmissible torque is exceeded, in which event the balls will move out of the holding recesses and ride in the safety grooves and permit relative rotative movement between the two parts as the balls move into and out of the safety grooves and holding recesses. The construction makes it possible to form the clutch with a relatively narrow axial dimension and without requiring safety mountings which are required in the axial ball clutch arrangement.

The number of balls and associated grooves may be varied in order to vary the size of the torque which may be transmitted. A number of balls greater than the number of holding recesses may be provided in order to facilitate the rotation of the two drive parts relative to each other even during rapid engagement and disengagement of the balls. The engagement openings of the balls are preferably formed by grooves traversing the circumferential safety groove and extending substantially in an axial direction and having a uniform cross-section. Such a form of holding groove formation is particularly simple to produce.

Accordingly, it is an object of the invention to provide an improved clutch having radially engageable spring-loaded ball driving members for transmitting the torque.

A further object of the invention is to provide a clutch which may be made of relatively narrow axial dimensions and which includes ball members which are held in holding recesses of one of the drive parts by springs carried on the other part and which includes a circumferential groove extending transversely to the holding grooves which permit the balls to move out of the holding grooves and into the circumferential grooves during an overload.

A further object of the invention is to provide a clutch which is simple in design, rugged in construction, and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there are illustrated preferred embodiments of the invention.

BRIEF DESCRIPTION OF THE DRAWING

In the Drawing:

FIG. 1 is a section taken along the line I—I of FIG. 2 of a clutch device constructed in accordance with the invention;

FIG. 2 is a section taken along the line II—II of FIG. 1;

FIG. 3 is a section taken along the line III—III of FIG. 1;

FIG. 4 is a view similar to FIG. 1 of another embodiment of the invention;

FIG. 5 is a section taken along the line V—V of FIG. 4;

FIG. 6 is a view similar to FIG. 4, but with the clutch parts in a disengaged position; and FIG. 7 is a partial elevational and partial sectional view of a hand drill having a clutch thereon constructed in accordance with the invention.

GENERAL DESCRIPTION OF THE PREFERRED EMBODIMENTS

Referring to the drawings in particular, the invention embodied therein in FIGS. 1 to 3, comprises an overload clutch which includes a first drive part 1 in the form of an axle disc having a circular cross-section and a second drive part 2 comprising an outer ring. The outer ring 2 has an interior diameter corresponding to the outer diameter of the disc 1 and it includes an interior surface in running engagement with the exterior surface of the axle disc. For power transmission, the outer ring second part 2 is formed as a gear having gear teeth 2a.

The first part 1 includes a hub portion which is mounted on a shaft 3 and affixed thereto for rotation therewith by a key 4. The first part 1 is located between spaced bearings 5 and 6. Over the outer circumference of the first part 1 are uniformly distributed bores or receiving recesses 1a which extend in a radial direction and which include openings 1b having a ball 8 therein which is loaded or biased radially outwardly by a compression spring 7.

In accordance with the invention, the outer ring or second part 2 has an interior surface with engagement openings 2b defined therearound at spacings comparable to the bores 1a for the balls 8. The balls 8 are urged into the engagement recesses 2b by the force of the spring 7 when the clutch is assembled, as indicated in FIG. 1.

The balls form a form-closed connection between the axle disc first part 1 and the outer ring second part 2. When the maximum transmissible torque between the first part 1 and the second part 2 is exceeded, the radial force exerted on the balls 8 outweigh the axial force produced by the compression springs 7 so that the balls 8 are forced out of the associated engagement openings 2b and into the safety groove 2c to permit relative movement between the two parts in a rotational direction. The engagement of the balls 8 in the safety groove 2c prevents any axial displacement of the outer ring 2 but permits rotative displacement of the two parts relative to each other after the maximum transmissible torque has been exceeded. The excessive torque is therefore no longer transmitted by the clutch but the first and second parts are turned relatively under constant engagement and disengagement of the balls 8 in the engagement openings 2b. Only after the torque has dropped below the maximum transmissible torque value of the clutch is there again a form-closed connection established between the balls 8 and the associated engagement openings 2b.

In FIG. 3, there is indicated, the engagement openings 2b which extend transversely in respect to the circumferentially extending safety grooves 2c.

As indicated in FIGS. 4 to 6, there is provided a clutch 50', having parts which are similarly designated to the corresponding parts of the first embodiment. The second part 2' includes a plurality of circumferentially spaced engagement recesses 2b' which are preferably formed in a simple manner by cutting cross-grooves 2f from one side of the part 2' to the other at the location of the receiving recesses 2b'. This produces a groove which traverses the circumferential safety groove 2c' and which has about the same cross-section as the safety groove 2c'. As can be seen from FIGS. 4, 5 and 6, the balls 8a', 8b' and 8c' do not engage in an opening or receiving recess 2b', but are arranged in the safety groove 2c'. The construction is such that there is no lateral yielding of the axle disc first part 1 relative to the outer ring second part. Lateral yielding is also prevented when the balls 8' are engaged and disengaged in rapid succession after the transmission torque maximum value has been exceeded, since there are three balls 8' in any position which serve only to secure the axial guidance.

In the overload condition indicated in FIG. 6, the clutch is in a position before the engagement of the balls in the receiving recesses 2b' after the clutch has been subjected to an excessive torque. All the balls 8' are thus in the circumferential safety groove 2c'.

An example of an application of the clutch of the invention is shown in FIG. 7 in respect to an electric hammer drill generally designated 52. Rotary movement is transmitted by a motor pinion 9 to an outer part 2 of the overload clutch 50. The balls 8 engage in the openings 2b and provide the means for transmitting the rotary movement to the first part 1 and the shaft 10. The shaft 10 transmits the movement through two bevel gears 11 and 12 to a drill holder 13 and thus to a drilling tool 14. If the torque transmitted by the clutch is exceeded for example, by the jamming of the drilling tool 14, the axle disc part 1 will no longer be turned due to the disengagement of the ball 8 from the associated receiving recesses 2b and the movement of the two parts relative to each other. This will continue until the jamming on the tool is reduced and the overload has ceased.

While specific embodiments of the invention have been shown and described in detail to illustrate the application of the principles of the invention, it will be understood that the invention may be embodied otherwise without departing from such principles.

What is claimed is:

1. An overload clutch comprising a first clutch member of circular cross-section having an outer running circumference, a second clutch member of ring-shaped form having an inner running circumference in running engagement with the outer circumference of said first clutch member, a plurality of generally radially extending bores defined at angularly spaced locations in one of said first and second clutch members with the bores terminating at one end at the running circumference of the one of said first and second clutch members in which they are located, the other one of said first and second clutch members having a number of angularly spaced ball receiving recesses formed in its running circumference with the number of said recesses being less than the number of said bores and with each recess arranged to be positioned opposite a corresponding said bore, a ball carried in each of said bores, spring means located within each said bore and biasing said ball located therein radially in a direction to cause it to move into an associated said ball receiving recess to define a form-closed driving connection between said first and second clutch members, and a circumferentially extending annular safety groove formed on the running circumference of the one of said first and second clutch members containing said ball receiving recesses and having a transverse cross section smaller than the cross section of said ball receiving recesses, and said safety grooves intersecting said ball receiving recesses for providing a path for the displacement of said balls from said ball receiving recesses to said safety groove upon application of an overload torque for permitting relative rotation of said first and second clutch members, and said balls not engageable within said ball receiving recesses being positioned within said safety groove for preventing axial displacement between said first and second clutch members.

2. An overload clutch, according to claim 1, wherein a number of grooves are formed in the one of said first and second clutch members in which said safety groove is formed with said grooves extending in the axial direction of said first and second parts and extending transversely of and intersecting said safety groove, said grooves having a cross-section substantially the same as said safety groove with the intersection of each of said grooves and said safety groove forming one of said ball receiving recesses.

3. An overload clutch, according to claim 1, therein said outer ring-shaped second part comprises a gear.

4. An overload clutch, according to claim 1, wherein said bores are defined in said first part and said spring means comprises a compression spring in each said bore.

5. An overload clutch, according to claim 1, wherein said ball receiving recesses comprise a transversely widened portion of said circumferential safety groove.

* * * * *